(12) United States Patent
Ghezel-Ayagh

(10) Patent No.: US 7,862,938 B2
(45) Date of Patent: Jan. 4, 2011

(54) INTEGRATED FUEL CELL AND HEAT ENGINE HYBRID SYSTEM FOR HIGH EFFICIENCY POWER GENERATION

(75) Inventor: Hossein Ghezel-Ayagh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 938 days.

(21) Appl. No.: 11/733,447

(22) Filed: Apr. 10, 2007

(65) Prior Publication Data

US 2008/0187789 A1 Aug. 7, 2008

Related U.S. Application Data

(60) Provisional application No. 60/888,186, filed on Feb. 5, 2007.

(51) Int. Cl.
H01M 8/04 (2006.01)
H01M 8/12 (2006.01)
H01M 8/18 (2006.01)

(52) U.S. Cl. .................. 429/425; 429/478; 429/496; 429/513

(58) Field of Classification Search .................. None
See application file for complete search history.

(56) References Cited

U.S. PATENT DOCUMENTS

| | | | |
|---|---|---|---|
| 3,905,884 A | 9/1975 | Parenti, Jr. et al. | |
| 4,031,865 A | 6/1977 | Dufour | |
| 4,792,384 A | 12/1988 | Levy et al. | |
| 4,917,971 A | 4/1990 | Farooque | |
| 5,221,586 A | 6/1993 | Morimoto et al. | |
| 5,532,573 A | 7/1996 | Brown et al. | |
| 5,541,014 A | 7/1996 | Micheli et al. | |
| 5,693,201 A | 12/1997 | Hsu et al. | |
| 5,712,055 A | 1/1998 | Khandkar et al. | |

(Continued)

FOREIGN PATENT DOCUMENTS

JP 63-119163 5/1988

(Continued)

OTHER PUBLICATIONS

G.T. Lee, et al., Fuel Cell/Gas Turbine System Performance Studies, Paper No. DOE/METC/C-97/7278, Fuel Cells '96 Review Meeting, Morgantown, West Virginia, Aug. 20-21, 1996.

*Primary Examiner*—John S Maples
(74) *Attorney, Agent, or Firm*—Cowan, Liebowitz & Latman, PC

(57) ABSTRACT

A fuel cell and heat engine hybrid system using a high-temperature fuel cell having an anode compartment adapted to receive fuel from a fuel supply path and to output anode exhaust gas and a cathode compartment adapted to receive oxidant gas and to output cathode exhaust gas. A heat engine assembly is adapted to receive oxidant gas and a further gas comprising one of the anode exhaust gas and a gas derived from the anode exhaust gas and to cause oxidation of the further gas and generate output power, the heat engine also generating heat engine exhaust including oxidant gas. The heat engine exhaust is then used to provide oxidant gas to the cathode compartment of the fuel cell.

40 Claims, 2 Drawing Sheets

U.S. PATENT DOCUMENTS

| | | |
|---|---|---|
| 5,955,039 A | 9/1999 | Dowdy |
| 5,968,680 A | 10/1999 | Wolfe et al. |
| 6,033,794 A | 3/2000 | George et al. |
| 6,162,556 A | 12/2000 | Vollmar et al. |
| 6,213,234 B1 | 4/2001 | Rosen et al. |
| 6,294,278 B1 | 9/2001 | Wohr et al. |
| 6,296,959 B2 * | 10/2001 | Takabe et al. ............... 429/412 |
| 6,329,091 B1 | 12/2001 | James |
| 6,365,290 B1 | 4/2002 | Ghezel-Ayagh et al. |
| 6,410,175 B1 | 6/2002 | Tillmetz et al. |
| 6,432,565 B1 | 8/2002 | Haines |
| 6,522,955 B1 | 2/2003 | Colborn |
| 6,571,897 B2 * | 6/2003 | Baumert et al. ............ 180/65.1 |
| 6,606,850 B2 | 8/2003 | Logvinov et al. |
| 6,609,582 B1 | 8/2003 | Botti et al. |
| 6,655,325 B1 | 12/2003 | Botti et al. |
| 6,759,154 B2 | 7/2004 | O'Brien et al. |
| 6,868,677 B2 | 3/2005 | Viteri et al. |
| 6,896,988 B2 | 5/2005 | Wang et al. |
| 6,915,869 B2 | 7/2005 | Botti et al. |
| 6,921,595 B2 | 7/2005 | Clawson et al. |
| 6,994,930 B1 | 2/2006 | Geisbrecht et al. |
| 2001/0036566 A1 | 11/2001 | Drekker et al. |
| 2002/0094463 A1 | 7/2002 | Luken et al. |
| 2003/0129465 A1 | 7/2003 | Nakamura et al. |
| 2004/0058211 A1 | 3/2004 | Tachtler et al. |
| 2004/0062961 A1 | 4/2004 | Sato et al. |
| 2005/0014039 A1 | 1/2005 | Rolf |
| 2005/0048345 A1 | 3/2005 | Meacham |
| 2005/0255351 A1 | 11/2005 | Fukuda |
| 2006/0046107 A1 | 3/2006 | Lindsey et al. |

FOREIGN PATENT DOCUMENTS

| | | |
|---|---|---|
| JP | 04-65066 | 3/1992 |
| JP | 2000-133295 | 5/2000 |
| JP | 2000-200617 | 7/2000 |
| WO | WO 99/46032 | 9/1999 |
| WO | WO 02/070402 | 9/2002 |
| WO | WO 02/103833 | 12/2002 |

* cited by examiner

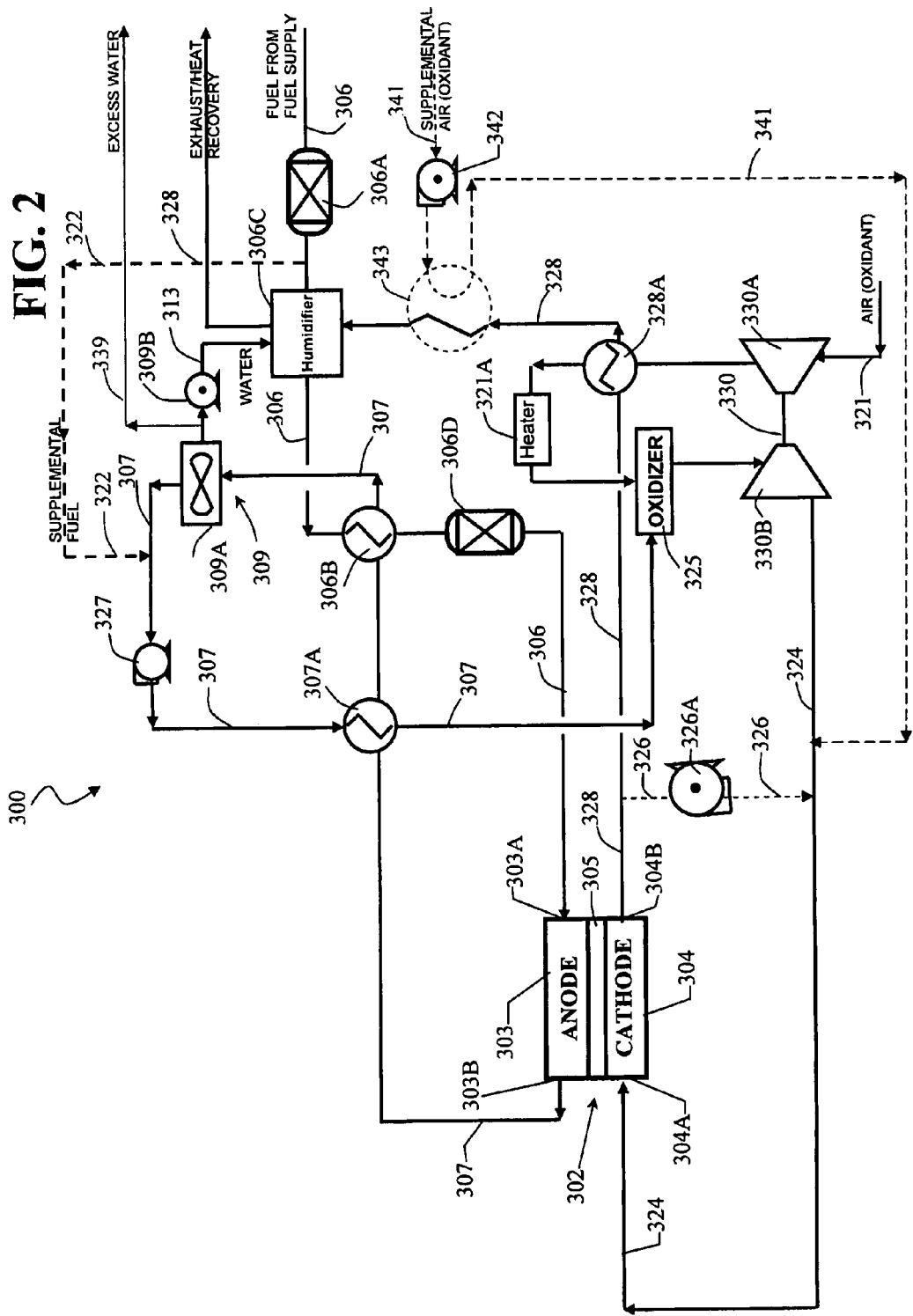

INTEGRATED FUEL CELL AND HEAT ENGINE HYBRID SYSTEM FOR HIGH EFFICIENCY POWER GENERATION

CROSS-REFERENCE TO RELATED APPLICATIONS

This application is a non-provisional application based on and claiming the benefit of the filing date of U.S. Provisional Patent Application Ser. No. 60/888,186, filed Feb. 5, 2007, the entire disclosure of which is incorporated herein by reference.

BACKGROUND OF THE INVENTION

This invention relates to fuel cell production systems and, in particular, to a fuel cell system integrated with a heat engine such as an internal combustion engine and an external combustion engine.

A fuel cell is a device, which directly converts chemical energy stored in hydrocarbon fuel into electrical energy by means of an electrochemical reaction. Generally, a fuel cell comprises an anode electrode and a cathode electrode separated by an electrolyte, which serves to conduct electrically charged ions.

A fuel cell may be combined with a heat engine such as a turbine generator to produce a high efficiency system, commonly called a hybrid system. In a commonly practiced hybrid system, a fuel cell typically is situated in the position normally occupied by the combustor of the turbine generator so that air compressed by the turbine generator compressor section is heated and then sent to the fuel cell cathode section. In this arrangement, the fuel cell is operated at a high pressure, which substantially increases the cost of the power plant hardware. The high pressure operation of the fuel cell inhibits the use of internal reforming in the fuel cell which further increases the plant cost and reduces efficiency, and subjects the fuel cell to potentially damaging pressure differentials in the event of plant upset. Furthermore, the fuel cell pressure is coupled with the gas turbine pressure, reducing the reliability of operation and limiting the application to system designs where the gas turbine pressure is nearly matched with the fuel cell pressure.

To overcome these disadvantages, another hybrid system has been developed where a heat engine in the form of a turbine generator is bottomed with a fuel cell so that the heated air discharged from the gas turbine is delivered to the cathode section of the fuel cell. U.S. Pat. No. 6,365,290, assigned to the same assignee hereof, discloses such a hybrid fuel cell/gas turbine system, in which waste heat from the fuel cell is used by a heat recovery unit to operate the heat engine cycle, and the system is arranged such that the compressed oxidant gas, heated in the heat recovery unit and by a high temperature heat exchanger, is expanded in the expansion cycle of the heat engine. It is then passed through an oxidizer (also commonly called combustor or burner), which also receives the anode exhaust, passed through the heat exchanger and the resultant gas delivered to the cathode section of the fuel cell.

In a modification of the system of the '290 patent, U.S. Pat. No. 6,896,988 assigned to the same assignee hereof, discloses an enhanced hybrid system for high temperature fuel cells including solid oxide and molten carbonate fuel cells which expands the applicability of the system of the '290 patent by providing a better match between the fuel cell size and the gas turbine. Despite the benefits provided by the system of the '988 patent, there are limitations to its application.

Both the systems of the '290 and '988 patents are intended for generation of electricity at very high efficiencies. However, they require a relatively high temperature heat exchanger, which may be very costly especially for large-scale power plants (>10 MW). Also, the aforesaid systems need to be more flexible if they are to be used in system configurations which are needed to better satisfy compromises between efficiency and power generation.

It therefore would be desirable to provide an alternative fuel cell and heat engine hybrid system having high efficiencies and providing greater flexibility in balancing power between a high temperature fuel cell such as a solid oxide or molten carbonate fuel cell and a heat engine assembly such as a compressor/turbine assembly.

It would also be desirable to provide a fuel cell and heat engine hybrid system which is better able to mitigate against the need for a high temperature heat exchanger (recuperator or regenerator) to be operated above the fuel cell cathode exhaust temperature.

It would further be desirable to provide a hybrid fuel cell and heat engine hybrid system, which may offer a less expensive alternative system configuration to the ones described in '290 and '988 patents for high temperature and near atmospheric pressure fuel cells.

SUMMARY OF THE INVENTION

A fuel cell and heat engine hybrid system comprising a high temperature fuel cell and a heat engine assembly is disclosed. The system is adapted so that oxidant gas such as air and a further gas comprising anode exhaust gas or gas derived from the anode exhaust gas of the fuel cell serve as inputs to the heat engine assembly. Oxidation (also referred to as burning or combustion) of the further gas occurs in the heat engine assembly and the heat engine assembly generates power and outputs a heat engine exhaust gas which includes oxidant gas. The heat engine exhaust gas is then used to provide oxidant gas to the cathode of the fuel cell. In certain cases, the anode exhaust is processed to remove some or all of the water content in the exhaust and/or compressed or pressurized to produce the further gas.

The heat engine assembly can include any variety of an Internal Combustion Engine such as a combustion turbine, a 4-cycle spark ignited (SI) reciprocating engine, and a 2-cycle compression ignited (CI) engine. The heat engine can also include an externally heated or fired heat engine such as Sterling engine, a turbocharger or a gas turbine.

A number of fuel cell and heat engine hybrid system configurations based on the type of fuel, such as natural gas, liquid fuel, etc, can be configured. Additionally, numerous components and heat exchanging arrangements can also be implemented with the different integrated fuel cell and heat engine system configurations.

The fuel cell and heat engine hybrid system disclosed hereinafter comprises a fuel cell having an anode section and a cathode section, a heat engine assembly comprising a gas turbine having a compressor section or cycle compressing oxidant supply gas and an expansion section or cycle, and a heat recovery unit responsive to exhaust gas from the cathode section of the fuel cell. The heat recovery unit heats and humidifies a fuel supply gas such as natural gas or syngas supplied by a gasifier before the fuel supply gas is fed to the anode compartment of the fuel cell.

In the disclosed system, the anode exhaust gas, optionally, is cooled and the product water is removed by a condenser. The cooled anode exhaust gas containing residual fuel not utilized in the fuel cell is then optionally compressed in a gas compressor and thereafter flows to a combustor or oxidizer forming a part of the heat engine assembly and which also receives heated compressed oxidant gas. The gas compressor boosting of the pressure of the anode exhaust gas helps bring the pressure of the gas output of the oxidizer up to the inlet pressure of the expansion cycle or section of the gas turbine of the heat engine assembly. The anode exhaust gas is then oxidized in the oxidizer and the output of the oxidizer including heated compressed oxidant gas is supplied to the expansion cycle or section of the gas turbine of the heat engine assembly. This results in a mechanical power output from the expansion section and an exhaust gas comprising oxidant gas which is then used as the oxidant gas for the cathode section of the fuel cell.

Also, in the disclosed system, the oxidant supply gas is compressed or pressurized in the compressor section or cycle of the heat engine assembly and is optionally heated in the heat recovery unit by the cathode exhaust gas to which, as above-mentioned, the heat recovery unit is responsive. This compressed heated oxidant supply gas then flows to the oxidizer or combustor of the heat engine assembly, as also above-mentioned. With the hybrid system, therefore, the recovery of waste heat from the fuel cell combined with the oxidation of the anode exhaust gas in the heat engine assembly results in very high system efficiencies.

In certain cases, supplemental air from a blower is combined with the exhaust gas from the expansion section of the gas turbine before it is fed to the cathode section of the fuel cell. The combined gas ensures a required cathode flow for both the oxidant gas and the removal of waste heat from the fuel cell.

BRIEF DESCRIPTION OF THE DRAWINGS

The above and other features and aspects of the present invention will become more apparent upon reading the following detailed description in conjunction with the accompanying drawings, in which:

FIG. 2 shows a block diagram of another fuel cell and heat engine hybrid system.

DETAILED DESCRIPTION

Figure 1:
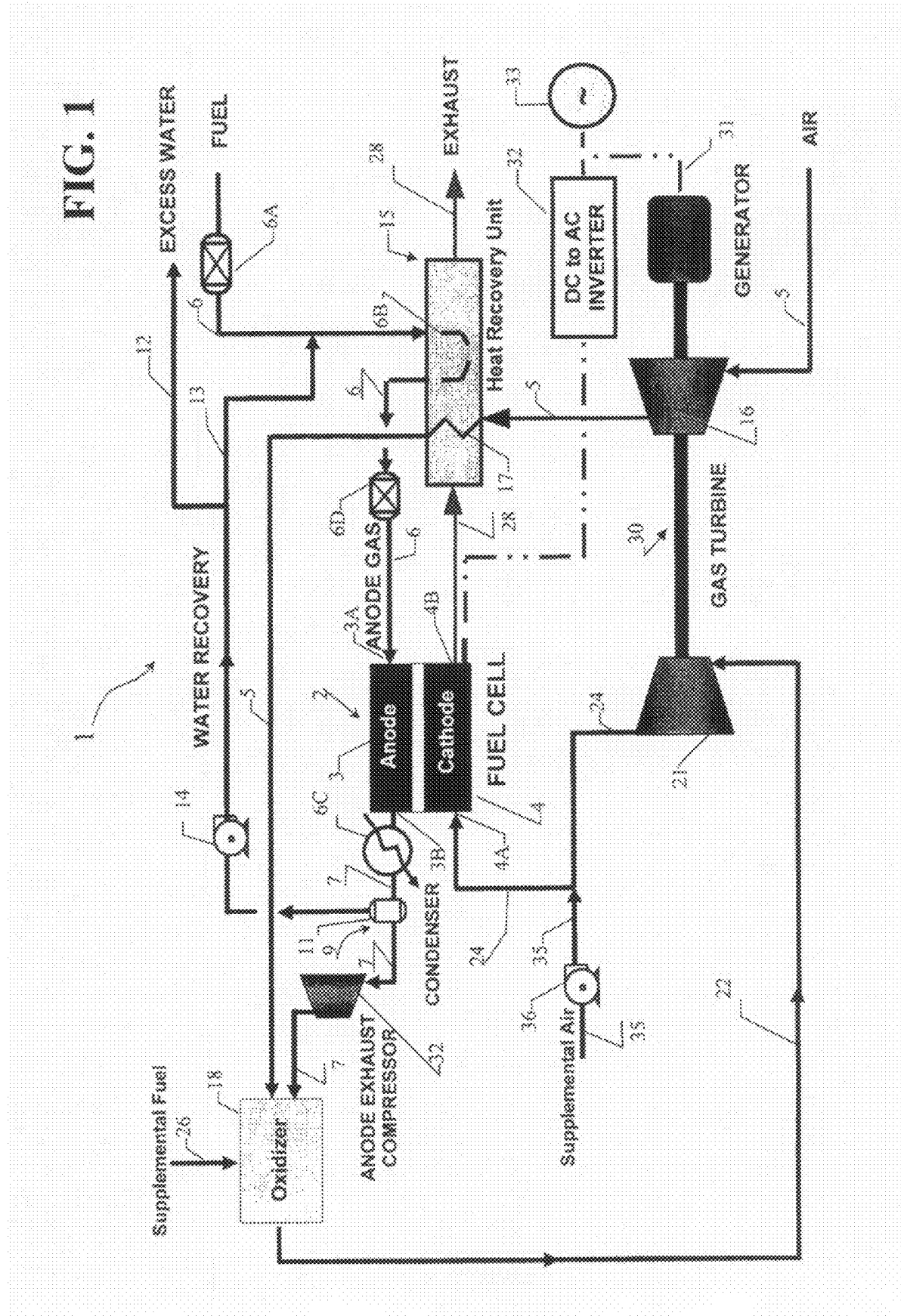
FIG. 1 shows a block diagram of a fuel cell and heat engine hybrid system using a high temperature fuel cell and a compressor/turbine as the heat engine.

FIG. 1 shows a block diagram of a hybrid fuel cell and heat engine system 1 for supplying power to a load. The system 1 comprises a high-temperature fuel cell 2 and a heat engine assembly 30. The fuel cell 2 includes an anode compartment 3 and a cathode compartment 4 separated by an electrolyte matrix. The anode compartment 3 is adapted to receive fuel from a fuel supply path 6 and to output anode exhaust. The cathode compartment 4 is adapted to receive oxidant gas and to output cathode exhaust. The hybrid system also optionally includes a water transfer assembly 9 for transferring water in the anode exhaust to the fuel supply path 6 and for outputting water-separated anode exhaust.

The fuel cell 2 can be any type of high temperature fuel cell such as a molten carbonate fuel cell or solid oxide fuel cell. The heat engine assembly 30 can include any variety of the Internal Combustion Engine such as a combustion turbine, a 4-cycle spark ignited (SI) reciprocating engine, and a 2-cycle compression ignited (CI) engine. The heat engine assembly 30 can also include an externally heated or fired heat engine such as Sterling engine, a turbocharger or a gas turbine. In the illustrative case shown, the heat engine assembly 30 comprises a compressor/turbine having a compression cycle or section 16 and a turbine or expansion section or cycle 21. The heat engine assembly also includes an oxidizer (also called a combustor or burner) 18.

Oxidant supply gas, shown as air, is compressed or pressurized in the compression section or cycle 16 of the heat engine assembly 30. The compressed oxidant gas is then fed to a heat recovery unit 15 also included in the hybrid system 1. In particular, the compressed oxidant gas is received in a heat exchanger section 17 of the heat recovery unit 15 and is heated by cathode exhaust gas delivered to the unit 15 from the cathode compartment 4 of the fuel cell 2. The oxidizer 18, forming a part of the heat engine assembly 30, is adapted to receive the compressed heated oxidant gas (air) from the heat exchanger 17. The oxidizer 18 also receives a further gas which comprises or is derived from the anode exhaust gas from the anode compartment 3 of the fuel cell 2.

In the illustrative case shown, the anode exhaust gas is passed through the water transfer assembly 9 which condenses and transfers water from the exhaust. The water-separated anode exhaust passed form the water transfer assembly 9 is then pressurized in an anode exhaust compressor 32, and the pressurized water-separated anode exhaust gas forms the above-mentioned further gas fed to the oxidizer 18.

The oxidizer 18 in FIG. 1 is configured as a combustor external to the compressor/turbine of the heat engine assembly 30. The oxidizer 18 can also be configured as an internal combustor as practiced, for example, in an ICE (Internal Combustion Engine), a 4-cycle spark ignited reciprocating engine, and a 2-cycle compression ignited engine. Moreover, the oxidizer 18 can either be a catalytic oxidizer or fired burner as practiced in combustion turbines.

In the oxidizer 18, the pressurized water-separated anode exhaust is oxidized with the heated compressed oxidant gas to result in an output gas which comprises compressed heated oxidant gas. The oxidizer output gas is then fed to the expansion section or turbine 21 of the heat engine assembly 30 where expansion of the gas results in mechanical power generation. The exhaust gas from the expansion section comprising expanded oxidant gas is then used to provide oxidant gas to the cathode compartment 4 of the fuel cell 2.

It should be noted that in the case of a 4-cycle SI or a 2-cycle CI used as the heat engine assembly 30, the low pressure water-separated anode exhaust does not need to be compressed before being fed to the heat engine assembly. In such situations, the anode exhaust compressor 32 need not be used in the system 1. Also, in certain cases, for example, at a very high gas turbine pressure ratio, the compressed air in the oxidant supply path 5 may not need to be heated by a heat exchanger. The system 1 will now be described in more detail below.

As shown in FIG. 1, a hydrocarbon containing fuel is supplied from a fuel supply (not shown for purposes of clarity and simplicity) to a fuel supply path 6 which carries the fuel to an inlet 3A of the anode compartment 3 of the fuel cell 2. In particular, as shown, the supply line 6 carries the fuel through a desulfurizer 6A, which removes sulfur-containing compounds present in the fuel. The desulfurizer 6A comprises one or more sulfur-adsorbent or sulfur-absorbent beds through which the fuel flows and which adsorb or absorb any sulfur-containing compounds in the fuel.

After being passed through the desulfurizer 6A, the fuel in the supply line 6 is combined with water from the water transfer assembly 9 via a water supply line 13 to produce humidified fuel. The humidified fuel is then pre-heated in the heat recovery unit 15 via a further heat exchanger 6B included in the unit 15 and also subjected to the cathode exhaust gas supplied to the unit. The pre-heated humidified fuel is then passed through a deoxidizer/preconverter unit 6D, which removes any, trace oxygen and heavy hydrocarbon contaminants from the fuel. Although not shown in FIG. 1, another heat exchanger may be utilized after the deoxidizer/preconverter unit 6D to raise the temperature of the fuel stream to a higher level as required by the anode 3 of the fuel cell assembly 2. The pre-heated deoxidized humidified fuel is then supplied to the anode compartment 3 through the inlet 3A.

Fuel entering the anode compartment 3 through the anode inlet 3A may be reformed internally to produce hydrogen and carbon monoxide and undergoes an electrochemical reaction with oxidant gas passing through the cathode compartment 4 of the fuel cell 2. Anode exhaust gas produced in the anode compartment 3 exits the fuel cell 2 through the anode outlet 3B into an anode exhaust path 7. The anode exhaust gas in the exhaust path 7 comprises a mixture of unreacted hydrogen, carbon monoxide, water vapor, carbon dioxide and trace amounts of other gases.

As shown in FIG. 1, the anode exhaust in the exhaust path 7 is passed to the water transfer assembly 9 which includes a condensing heat exchanger 6C, also called a condenser, a knock out pot 11 and a pump 14. The anode exhaust gas is cooled in the condensing heat exchanger 6C so that water present in the anode exhaust condenses and a mixture of liquid water and an exhaust gas comprising the remaining components of the anode exhaust gas is formed. The mixture of the exhaust gas and water steam is thereafter passed through the knock out pot 11 in which water is separated from the exhaust gas and water-separated anode exhaust is outputted to the anode exhaust path 7. Water that is separated in the knock out pot 11 is passed through the pump 14 which increases the pressure of the water. Separated and pressurized water is thereafter carried to the fuel supply path 6 via the water supply line 13. In addition, any excess water produced in the knock out pot 11 and the pump 14 may be exported from the system 1 through a connecting line 12.

In this illustrative case, a common knock out pot and pump are suitable for use in the system 1 for separating and increasing the pressure of the water. As can be appreciated, other water transfer devices or assemblies, such as a partial-pressure swing water transfer device, a conventional enthalpy wheel humidifier, a cooling radiator, a membrane, a packed column or an absorber/stripper type system may be used in place of, or with the heat exchanger 6C, knock out pot 11 and the pump 14 for transferring part or all of the water.

The water-separated anode exhaust exits the knock out pot 11 and comprises primarily hydrogen and CO (carbon monoxide) fuel and $CO_2$ with trace amounts of water and unconverted hydrocarbons (typically methane). This water-separated anode exhaust gas is carried by the anode exhaust path 7 from the knock out pot 11 to the anode exhaust compressor 32, and then, after being compressed, to the oxidizer 18 where it is mixed with heated and compressed oxidant gas or air in the line 5 from heat exchanger 17. The compressed water-separated anode exhaust gas in the path 7 is oxidized by the heated compressed oxidant gas in the oxidizer 18 so as to produce an output gas comprising heated compressed oxidant gas at a higher temperature.

The output gas from the oxidizer 18 is carried by the line 22 to the expansion section or turbine 21 of the heat engine assembly 30 where it is expanded. The expansion process produces mechanical power which is converted by a generator 31 to electric power. In place of the generator 31, a high speed alternator may be utilized to convert the mechanical power derived from the turbine 21 into the electric power.

In the illustrative case shown in FIG. 1, the fuel cell direct current (dc) electrical output is converted to an alternating current (ac) electrical output in a dc-to-ac inverter 32. The electric output from generator 31 and the dc-to-ac inverter 32 are combined at 33 and the combined power directed to a utility grid or a customer's load.

In certain cases, the oxidizer 18 is also supplied with supplemental fuel from a supplemental fuel supply (not shown) via a supplemental fuel supply path 26. In the oxidizer 18, unspent fuel including hydrogen, CO, and hydrocarbons in the water-separated anode exhaust and any supplemental fuel provided are burned in the presence of the heated compressed oxidant gas, i.e., air, from the heat recovery unit 15. The resultant hot compressed oxidant gas is thus suitable for production of mechanical power in the expansion section 21 of the heat engine assembly 30.

In certain cases, a supplemental air path, shown as path 35 in FIG. 1, may be utilized to provide additional air in excess of the oxidant provided by the heat engine. One of the reasons for using the supplemental air in path 35 is to control temperatures at the cathode inlet 4A and the cathode outlet 4B. The supplemental air path 35 is provided by air blower 36 and is combined with the heat engine exhaust in the exhaust path 24 before entering the fuel cell.

Also, the exhaust from the expansion section, comprising primarily expanded oxidant gas, i.e., $O_2$, $N_2$ and $CO_2$, is led by the cathode oxidant gas path 24, combined with the supplemental air in the path 35, and directed to an inlet 4A of the cathode compartment 4 where it undergoes electrochemical reaction. Cathode exhaust gas, as discussed above, exits the cathode compartment 4 through a cathode outlet 4B and is carried by a cathode exhaust path 28 to and through the heat exchanger 17, in which the cathode exhaust is cooled, thereby heating up the pressurized oxidant supply gas or air in the path 5. The cathode exhaust gas in the exhaust path 28 is then cooled further in passing through the heat exchanger 6B, thereby heating up and humidifying the fuel in the path 6. The cooled cathode exhaust gas is then eliminated from the system 1 and/or used in further waste heat recovery. Thus, the heat energy stored in the cathode exhaust gas leaving the system 1 may be used in other applications, such as residential heating.

Table 1 shows a comparison of a nominal 300 kW system based on the system of FIG. 1 using a carbonate fuel cell versus a nominal 300 kW system based on the system of the above-mentioned '290 patent. As can be appreciated, the system of FIG. 1 has a comparable power and slightly better efficiency than the system of '290 patent. The high anode exhaust compression power is more than compensated by the higher gas turbine power in the system of FIG. 1 as compared to the system of the '290 patent. The 300 kW system based on the system of FIG. 1 has a higher turbine inlet temperature (shown as path 22 in FIG. 1) and gas turbine power as compared to the turbine inlet temperature and gas turbine power of the system based on the '290 patent which is limited by the materials used in a high temperature recuperator.

TABLE 1

Comparison of the system power and efficiency of a 300 kW system based on system of FIG. 1 versus the system of U.S. Pat. No. 6,365,290

| System Parameters | 6,265,290 Patent | This Invention |
|---|---|---|
| Fuel cell stack DC, kW | 295 | 295 |
| DC/AC loss, 5.4%, kW | 16 | 16 |
| Stack gross AC, kW | 279 | 279 |

TABLE 1-continued

Comparison of the system power and efficiency
of a 300 kW system based on system of FIG. 1
versus the system of U.S. Pat. No. 6,365,290

| System Parameters | 6,265,290 Patent | This Invention |
|---|---|---|
| Turbine, kW | 119 | 137 |
| Compressor, kW | 81 | 66 |
| Generator loss, 10%, kW | 4 | 7 |
| Gas turbine power output, kW | 34 | 64 |
| Parasitic power | 5 | 5 |
| Anode Exhaust compressor | 0 | 22 |
| System total output, kW | 308 | 316 |
| System energy input (LHV), kW | 539 | 539 |
| System energy efficiency (LHV) | 57.2% | 58.6% |

As discussed above, the system in FIG. 1 utilizes a particular heat exchanging and system component arrangement and, in particular, a heat engine assembly 30 comprising a compressor/turbine. In other illustrative cases, the system can employ other heat engine assemblies, such as a combustion turbine, a recuperative turbine, or a microturbine. In such cases, the components of the system and heat exchangers employed, and the arrangement thereof, may vary, and additional components may be used, so as to achieve optimum efficiency. An illustration of a further arrangement hybrid system is shown in FIG. 2. However, it is noted that while the system arrangements of FIGS. 1 and 2 demonstrate the present hybrid system, it is evident to those of skill in the art that the system can be can be implemented in numerous other system configurations and heat exchanging arrangements.

FIG. 2 shows an alternate arrangement of fuel cell and heat engine hybrid system 300. The system 300 includes a heat engine assembly 330 which comprises a gas turbine having compression and expansion sections 330A and 330B and which further comprises an oxidizer 325. The system 300 also includes a high temperature fuel cell 302 integrated with the heat engine assembly 330. The operation of the system 300 and the supply and flow of fuel and other operating materials to the fuel cell 302 and the heat engine assembly 330 are controlled using a control assembly, as discussed in more detail below.

As shown in FIG. 2, the high-temperature fuel cell 302 comprises an anode compartment 303 and a cathode compartment 304 separated by an electrolyte matrix 305. The anode compartment 303 of the fuel cell 302 is supplied with fuel from a fuel supply (not shown) carried by a fuel supply path 306. As shown, fuel carried in the fuel supply path 306 is desulfurized in a desulfurizer 306A and then combined with water and pre-heated in a humidifying heat exchanger 306C.

In particular, the heat exchanger 306C receives recycled water from a water supply path 313, as discussed in more detail herein below, and the pre-heating of the fuel and water mixture is accomplished by passing cathode exhaust gas through the heat exchanger 306C to recover heat energy stored in the cathode exhaust. The humidified fuel is passed through another heat exchanger 306B, in which the fuel is further pre-heated by recovering heat from anode exhaust gas and thereafter deoxidized in a deoxidizer/pre-reformer 306D, which removes any trace oxygen and heavy hydrocarbon contaminants from the fuel. Deoxidized and pre-reformed fuel is then supplied to the anode 303 through an anode inlet 303A.

In the anode compartment, fuel undergoes an electrochemical reaction and spent fuel leaves the anode compartment 303 through an anode outlet 303B as anode exhaust gas. Anode exhaust gas is carried by an anode exhaust path 307 from the anode outlet 303B, and is passed through heat exchangers 307A and 306B to cool the anode exhaust before carrying the exhaust to a water transfer assembly 309. In this illustrative case shown, the water transfer assembly 309 includes a cooling radiator or air-cooled heat exchanger 309A which condenses out and separates the water from the anode exhaust gas, and a pump 309B, which increases the pressure of the water separated by the cooling radiator or air-cooled heat exchanger 309A. Water separated by the transfer assembly 309 is then carried out by the water supply path 313 and provided to the humidifying heat exchanger 306C. The cooling radiator or air-cooled heat exchanger 309A also outputs water-separated anode exhaust comprising remaining components of the anode exhaust, i.e. hydrogen, $CO_2$ and trace amounts of water and CO.

It is understood that the configuration of the water transfer assembly 309 is not limited to the arrangement shown in FIG. 2. For example, the water transfer assembly shown FIG. 1 or any other suitable water transfer device or assembly may be used in place of the water transfer assembly 309 shown in FIG. 2. Moreover, excess water may be exported out of the system 300 via a water exhaust path 339.

The water-separated anode exhaust gas is carried out of the water transfer assembly 309 by the anode exhaust path 307. In certain cases, supplemental fuel from a supplemental fuel supply, for example a slip stream of the desulfurized fuel from the desulfurizer 306A, is added to the water-separated anode exhaust gas via a supplemental fuel supply path 322. In certain cases, the source of the supplemental fuel may also be different than the main fuel supply. The amount of supplemental fuel added to the water-separated anode exhaust gas is controlled based on the detected power demand, such that no supplemental fuel is added during low power demands exceeded by the power produced by the fuel cell 302 and a pre-selected amount of supplemental fuel is controlled to be added to the water-separated anode exhaust during higher power demands.

The water-separated anode exhaust, or the mixture of water-separated anode exhaust and supplemental fuel, is carried to an anode boost compressor 327. The compressor 327 compresses these gases, and thereafter passes them to the heat exchanger 307A in which the compressed water-separated anode exhaust, or the mixture of water-separated anode exhaust and supplemental fuel, is heated by the hot exhaust gas from the anode 303.

The compressed heated water-separated anode exhaust gas, or the compressed heated mixture of water-separated anode exhaust and supplemental fuel, is then carried to an oxidizer 325 of the heat engine 330, which also receives compressed pre-heated oxidant gas in the form of air from a supply path 321. In particular, air is supplied from the path 321 to the compressor section 330A of the gas turbine of the heat engine 330, in which the air is compressed, and the compressed air is further heated in a heat exchanger 328A by the cathode exhaust. Further heating of the compressed air may be done by a start-up heater 321A, but normally the heater is used only when starting the turbine in a configuration where supplemental fuel is unavailable.

The compressed heated air is then combined with the water-separated anode exhaust, or the mixture of water-separated anode exhaust and supplemental fuel, in the oxidizer 325, which oxidizes the resulting mixture to produce an output gas comprising hot compressed oxidant gas. A turbine section 330B of the gas turbine of the heat engine 330 then allows expansion of the hot compressed gas from the oxidizer and outputs mechanical power and also outputs turbine exhaust gas comprising primarily $CO_2$, $O_2$ and $N_2$. In cases where the fuel cell is operated at high fuel utilization and no supplemental fuel is used to maximize efficiency, the water-separated anode exhaust gas may be very low in heat content and require the oxidizer 325 to include a catalyst to promote the complete combustion of the water-separated anode exhaust gas.

In certain cases, a supplemental air path, shown as path 341 (dotted line) in FIG. 2, may be utilized to provide additional air in excess of the oxidant provided by the heat engine. One of the reasons for using the supplemental air 341 is to control temperatures at the cathode inlet 304A and the cathode outlet 304B. Another reason for the supplemental air is to provide system air during the power plant start-up. As shown in FIG. 2, the supplemental air path 341 is provided by air blower 342 and optionally is pre-heated in the heat exchanger 343 by the cathode exhaust gas 328.

Turbine exhaust gas from the expansion or turbine section 330B, comprising oxidant gas suitable for use in a fuel cell, is carried by a cathode oxidant gas path 324 to the cathode compartment 304 through a cathode inlet 304A. If supplemental air is used, the turbine exhaust gas is combined with the preheated supplemental air 341 in the cathode oxidant gas path 324. After passing through the cathode 304, a high-temperature cathode exhaust gas comprising spent oxidant gas is outputted from the cathode 304 through a cathode outlet 304B into a cathode exhaust path 328. This cathode exhaust gas is cooled by passing through the heat exchanger 328A, which pre-heats compressed oxidant gas leaving the compression section 330A of the gas turbine, and, if employed, is further cooled in the supplemental air pre-heater 343, and is thereafter further cooled in the humidifying heat exchanger 306C, which, as above-mentioned, pre-heats and humidifies fuel in the fuel supply path 306. Cooled cathode exhaust is then exported out of the system 300 and may be used in further heat recovery co-generation such as combined heat and power application, steam bottoming cycle, or Organic Rankin Cycle.

As is also shown in FIG. 2, a portion of the cathode exhaust gas may be recycled back to the cathode 304 via a cathode recycle path 326, which includes a recycle blower 326A. Recycled cathode exhaust is combined with the oxidant gas in the path 324 before being provided to the cathode inlet 304A.

As an example, the performance characteristics of a 40 MW power plant based on a Molten carbonate Fuel Cell (MCFC) hybrid system configured as in FIG. 2 is presented in Table 2. Overall LHV efficiency for the conceptualized system is 61.8%.

TABLE 2

40 MW Plant Performance

| Fuel Cell | |
|---|---|
| DC Power Output, MW | 36.1 |
| AC Power Output, MW | 34.3 |
| Gas Turbine | |
| Expander Power, MW | 21.8 |
| Compressor Power, MW | (10.4) |
| Net AC Power, MW | 10.8 |
| Plant Parasitic Load | |
| Auxiliary Loads, MW | (4.4) |
| Net Power Output, MW | 40.8 |
| Efficiency, % (LHV of Natural Gas) | 61.8 |

The system 330 of FIG. 2 results in similar efficiencies and improvements as the system 1 shown in FIG. 1. The system of FIG. 2, like the system of FIG. 1, eliminates the need for an oxidant gas supply assembly and for a water supply assembly by using the heat engine exhaust to provide oxidant gas to the cathode and by recycling water in the anode exhaust to the fuel. In addition, the embodiment of FIG. 2 effectively recovers heat from the anode and the cathode exhaust gases produced by the fuel cell thus reducing the need for independent heating devices.

In all cases it is understood that the above-described arrangements are merely illustrative of the many possible specific embodiments which represent applications of the present invention. For example, the heat engine is not limited to the types described herein, and other devices, such as a diesel engine, may be suitable for use in the power production system. Moreover, additional components may be required to achieve a desired composition of the gas supplied to the heat engine and for optimum power production. In some cases, a steam turbine or Organic Rankine Cycle bottoming cycle system may be used in the hybrid system to recover additional heat from the fuel cell exhaust gases by using hot exhaust gases to generate steam, which is the working fluid of the steam turbine system. Numerous and varied other arrangements can be readily devised in accordance with the principles of the present invention without departing from the spirit and scope of the invention.

What is claimed is:

1. A fuel cell and heat engine hybrid system comprising:
   a high-temperature fuel cell including an anode compartment adapted to receive fuel from a fuel supply path and to output anode exhaust gas and a cathode compartment adapted to receive oxidant gas and to output cathode exhaust gas;
   a heat engine assembly adapted to receive oxidant gas and a further gas comprising one of anode exhaust gas and a gas derived from anode exhaust gas and to cause oxidation of said further gas and generate output power, said heat engine also generating heat engine exhaust including oxidant gas, and
   wherein said heat engine exhaust is used to provide oxidant gas to said cathode compartment of said fuel cell.

2. A fuel cell and heat engine hybrid system in accordance with claim 1, further comprising:
   a water transfer assembly condensing and transferring water from said anode exhaust gas and outputting water-separated anode exhaust gas; and
   said further gas comprising said water-separated anode exhaust gas.

3. A fuel cell and heat engine hybrid system in accordance with claim 2, wherein:
   said water transfer assembly transfers a part or all of said water to said fuel supply path.

4. A fuel cell and heat engine hybrid system in accordance with claim 3, wherein:
   said water transfer assembly increases the pressure of said part or all of said water transferred to said fuel supply path.

5. A fuel cell and heat engine hybrid system in accordance with claim 2, further comprising:
   a compressor compressing said water-separated anode exhaust; and
   said further gas comprising said compressed water-separated anode exhaust gas.

6. A fuel cell and heat engine hybrid system in accordance with claim 5, wherein:
   said heat engine is adapted to receive supplemental fuel.

7. A fuel cell and heat engine hybrid system in accordance with claim 6, wherein:
said supplemental fuel is supplied to one of said water-separated anode exhaust and to said heat engine.

8. A fuel cell and heat engine hybrid system in accordance with claim 7, wherein:
said supplemental fuel is supplied from a portion of the fuel in said fuel supply path.

9. A fuel cell and heat engine hybrid system in accordance with claim 8, wherein:
supplemental oxidant gas is supplied to said heat engine exhaust before said heat engine exhaust is received in said cathode compartment of said fuel cell.

10. A fuel cell and heat engine hybrid system in accordance with claim 9, wherein
said heat engine comprises one of an internal or external combustion engine, a two-cycle engine, a 4-cycle reciprocating engine, a combustion turbine, a recuperative turbine, a turbocharger, a compressor/turbine assembly, a Stirling engine and a microturbine.

11. A fuel cell and heat engine hybrid system in accordance with claim 6, wherein
said heat engine comprises one of an internal or external combustion engine, a two-cycle engine, a 4-cycle reciprocating engine, a combustion turbine, a recuperative turbine, a turbocharger, a compressor/turbine assembly, a Stirling engine and a microturbine.

12. A fuel cell and heat engine hybrid system in accordance with claim 2, wherein:
said water transfer assembly comprises condenser condensing water in said anode exhaust gas, a knockout pot following said condenser for separating water from said anode exhaust gas to produce said water-separated anode exhaust gas and a pump for increasing pressure of the separated water.

13. A fuel cell and heat engine hybrid system in accordance with claim 2, wherein:
said water transfer assembly comprises one of a water transfer device, an enthalpy wheel humidifier, a cooling radiator, a membrane, a surface condenser, an air cooled heat exchanger and a direct contact type condenser.

14. A fuel cell and heat engine hybrid system in accordance with claim 1, wherein:
said fuel in said fuel supply path is pre-heated using at least one of said cathode exhaust gas and said anode exhaust gas.

15. A fuel cell and heat engine hybrid system in accordance with claim 1, wherein:
said heat engine is further adapted to receive supplemental fuel.

16. A fuel cell and heat engine hybrid system in accordance with claim 15, wherein:
said supplemental fuel is controlled responsive to load variations.

17. A fuel cell and heat engine hybrid system in accordance with claim 16, wherein:
said oxidant gas received by said heat engine is controlled.

18. A fuel cell and heat engine hybrid system in accordance with claim 16, wherein:
said supplemental fuel is controlled such that when a load exhibits a low power demand, no supplemental fuel is supplied to said heat engine, and when said load exhibits a high power demand, an increased amount of supplemental fuel is supplied to said heat engine to satisfy said high power demand.

19. A fuel cell and heat engine hybrid system in accordance with claim 1, wherein:
said high-temperature fuel cell is one of a carbonate fuel cell and a solid oxide fuel cell.

20. A fuel cell and heat engine hybrid system in accordance with claim 1, wherein:
said oxidant gas is pre-heated by said cathode exhaust.

21. A fuel cell and heat engine hybrid system in accordance with claim 1, wherein:
said oxidant gas comprises air.

22. A fuel cell and heat engine hybrid system in accordance with claim 1, further comprising:
a cathode exhaust recycle path for recycling a portion of said cathode exhaust to said cathode.

23. A fuel cell and heat engine hybrid system in accordance with claim 1, wherein:
said heat engine comprises one of an internal or external combustion engine, a two-cycle engine, a 4-cycle reciprocating engine, a combustion turbine, a recuperative turbine, a turbocharger, a compressor/turbine assembly, a Stirling engine and a microturbine.

24. A fuel cell and heat engine hybrid system in accordance with claim 1, wherein:
said heat engine comprises: an oxidizer receiving said oxidant gas received by said heat engine and said further gas and oxidizing the further gas using the oxidant gas to produce an output gas; a compressor-turbine having a compression section and an expansion section, said compression section receiving an oxidant gas and compressing said oxidant gas to produce the oxidant gas to be received by said oxidizer and said expansion section receiving and expanding said output gas to generate said power and produce said heat engine exhaust.

25. A fuel cell and heat engine hybrid system in accordance with claim 24, further comprising:
a water transfer assembly condensing and transferring water from said anode exhaust gas and outputting water-separated anode exhaust gas; and
said further gas comprising said water-separated anode exhaust gas.

26. A fuel cell and heat engine hybrid system in accordance with claim 25, further comprising:
said water transfer assembly comprises one of a first and second unit; said first unit having a condenser for condensing the water in said anode exhaust gas, a knockout pot following said condenser for separating water from said anode exhaust gas to produce said water-separated anode exhaust gas and a pump for increasing pressure of the water-separated anode exhaust; and a second unit having a cooling radiator for condensing and separating water from said anode exhaust gas to produce said water-separated anode exhaust gas and a pump for increasing the pressure of the water separated anode exhaust.

27. A fuel cell and heat engine hybrid system in accordance with claim 26, wherein:
said water transfer assembly transfers a part or all of said water to said fuel supply path and comprises said first unit; and
said fuel cell and heat engine hybrid system further comprises: a compressor compressing said water-separated anode exhaust, said further gas comprising said compressed water-separated anode exhaust gas; and a heat recovery unit responsive to said cathode exhaust gas and having a first heat exchanger responsive to said compressed oxidant gas from said compression section to heat said compressed oxidant gas and a second heat exchanger in the fuel path for heating said fuel before said fuel is received in anode compartment of said fuel cell.

28. A fuel cell and heat engine hybrid system in accordance with claim 26, wherein:

said water transfer assembly transfers a part or all of said water to said fuel supply path and comprises said second unit; and said fuel cell and heat engine hybrid system further comprises: a compressor compressing said water-separated anode exhaust, said further gas comprising said compressed water-separated anode exhaust gas; a first heat exchanger responsive to said anode exhaust gas and said compressed water-separated anode exhaust gas for heating said compressed water-separated anode exhaust gas before said compressed water-separated anode exhaust gas is received in said heat engine; a second heat exchanger responsive to said cathode exhaust and said compressed oxidant gas from said compression section of said compressor/turbine for heating said compressed oxidant gas; a third heat exchanger responsive to said cathode exhaust after passage through said second heat exchanger and in a supplemental air path for heating supplemental air in said supplemental air path before the supplemental air is supplied to the exhaust gas containing oxidant gas from the heat engine; a humidifier in said fuel supply path responsive to said cathode exhaust gas after passage through said third heat exchanger and for receiving water transferred by said water transfer assembly for humidifying the fuel in said fuel supply path; and a fourth heat exchanger responsive to the anode exhaust gas after the anode exhaust gas passes through said first heat exchanger and in said fuel path after said humidifier for heating the humidified fuel in said fuel supply path before the fuel is received in said anode compartment of said fuel cell.

29. A fuel cell and heat engine hybrid system in accordance with claim 26, wherein:

said water transfer assembly transfers a part or all of said water to said fuel supply path; and said fuel cell and heat engine hybrid system further comprises: a compressor compressing said water-separated anode exhaust, said further gas comprising said compressed water-separated anode exhaust gas.

30. A fuel cell and heat engine hybrid system in accordance with claim 29, wherein:

said heat engine is further adapted to receive supplemental fuel.

31. A fuel cell and heat engine hybrid system in accordance with claim 1, wherein:

supplemental oxidant gas is supplied to said heat engine output gas before said heat engine output gas is received in said cathode compartment of said fuel cell.

32. A fuel cell and heat engine hybrid system in accordance with claim 31, wherein:

said heat engine comprises one of an internal or external combustion engine, a two-cycle engine, a 4-cycle reciprocating engine, a combustion turbine, a recuperative turbine, a turbocharger, a compressor/turbine assembly, a Stirling engine and a microturbine.

33. A method of operating a fuel cell and heat engine hybrid system comprising:

operating a high-temperature fuel cell by supplying fuel to an anode compartment of the fuel cell and oxidant gas to the cathode compartment of the fuel cell;

providing an oxidant gas and a further gas to a heat engine assembly, said further gas comprising one of anode exhaust gas and a gas derived from anode exhaust gas, and said heat engine causing oxidation of said further gas and generating output power, said heat engine also generating heat engine exhaust including oxidant gas, and using said heat engine exhaust to provide oxidant gas to said cathode compartment of said fuel cell.

34. The method of claim 33, further comprising:

removing water from said anode exhaust to form water-separated anode exhaust, said further gas comprising said water-separated anode exhaust.

35. The method of claim 34, further comprising:

compressing said water-separated anode exhaust, said further gas comprising said compressed water-separated anode exhaust.

36. The method of claim 35, wherein:

said heat engine comprises: an oxidizer; and a compressor-turbine having a compression section and an expansion section;

and said method further comprises:

supplying oxidant gas to said compression section to compress said oxidant gas to produce the oxidant gas to be received by said heat engine;

supplying the oxidant gas received by said heat engine and said further gas to said oxidizer wherein the further gas is oxidized by the oxidant gas to produce an output gas; and supplying said oxidizer output gas to the expansion section of said heat engine to expand said output gas and to generate said power, thereby producing said heat engine exhaust.

37. The method of claim 36, further comprising:

pre-heating the fuel to be received by the anode compartment of said fuel cell with one or more of the cathode exhaust gas from the cathode compartment of said fuel cell and the anode exhaust gas;

and supplying the water removed from the anode exhaust gas to the fuel for the anode compartment of the fuel cell.

38. The method of claim 33, wherein:

said heat engine comprises one of an internal or external combustion engine, a two-cycle engine, a 4-cycle reciprocating engine, a combustion turbine, a recuperative turbine, a turbocharger, a compressor/turbine assembly, a Stirling engine and a microturbine.

39. The method of claim 38, wherein:

a supplemental oxidant gas is supplied to said heat engine output gas before said heat engine output gas is received in said cathode compartment of said fuel cell.

40. The method of claim 39, wherein:

said supplemental oxidant gas is preheated first before being supplied to said heat engine output gas before said heat engine output gas is received in said cathode compartment of said fuel cell.

* * * * *